US011738766B2

(12) United States Patent
Carlhoff et al.

(10) Patent No.: US 11,738,766 B2
(45) Date of Patent: Aug. 29, 2023

(54) CONTROL OF VEHICLE FUNCTIONS

(71) Applicant: Ford Global Technologies, LLC, Dearborn, MI (US)

(72) Inventors: Philipp Carlhoff, Herzogenrath (DE); Roman Atilla Koch, Aachen/Nordrhein-Westfalen (DE); Yuliya Aksyutina, Jülich (DE); Monika Angst, Aachen (DE); Rainer Busch, Aachen (DE); Cem Mengi, Aachen (DE); Thomas Gerlitz, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 17/208,218

(22) Filed: Mar. 22, 2021

(65) Prior Publication Data
US 2021/0309245 A1 Oct. 7, 2021

(30) Foreign Application Priority Data

Apr. 3, 2020 (DE) .......................... 102020109379.9

(51) Int. Cl.
*B60W 50/14* (2020.01)
*B60W 50/08* (2020.01)
*H04L 12/40* (2006.01)

(52) U.S. Cl.
CPC .......... *B60W 50/14* (2013.01); *B60W 50/085* (2013.01); *H04L 12/40* (2013.01);
(Continued)

(58) Field of Classification Search
CPC .............. B60W 50/14; B60W 50/085; B60W 2050/146; H04L 12/40; H04L 2012/40215; H04L 2012/40273
(Continued)

(56) References Cited

U.S. PATENT DOCUMENTS 9,739,226 B2  8/2017 Elwart et al.
10,189,483 B2 * 1/2019 Grossman ............. B60W 50/14
(Continued)

FOREIGN PATENT DOCUMENTS

CN     202448964 U    9/2012
CN     103761462 A    4/2014
(Continued)

OTHER PUBLICATIONS

Eric et al., "Automotive Software Architecture: Migration Challenges from an Event-Triggered to a Time-Triggered Communication Scheme," 2009, Publisher: IEEE.*
(Continued)

*Primary Examiner* — Tuan C To
(74) *Attorney, Agent, or Firm* — Brandon Hicks; Bejin Bieneman PLC

(57) ABSTRACT

A method for the automated performance of vehicle functions is specified. The method includes: checking for the existence of a triggering event; if there is a triggering event, selecting a vehicle function procedure schema associated with the present triggering event; generating and outputting a signal representing the linked vehicle function procedure schema 3a, 3b, 3c to a service; generating and outputting service signals 6a, 6b, 6c based on a signal 4 representing the linked vehicle function procedure schema to control devices; designed for controlling vehicle function devices; generating and outputting control signals based on the service signals to the vehicle function devices; and performing vehicle functions 1a, 1b, 1c based on the control signals. In addition, a system for the automated performance of vehicle functions, a vehicle with such a system, a computer program, and a computer-readable medium are specified.

16 Claims, 3 Drawing Sheets

(52) U.S. Cl.
CPC ............... *B60W 2050/146* (2013.01); *H04L 2012/40215* (2013.01); *H04L 2012/40273* (2013.01)

(58) Field of Classification Search
USPC ............................................................ 701/1
See application file for complete search history.

(56) References Cited

U.S. PATENT DOCUMENTS

| | | | |
|---|---|---|---|
| 10,200,371 B2 * | 2/2019 | Darnell | H04W 12/084 |
| 10,407,008 B2 | 9/2019 | Bonnet et al. | |
| 11,183,066 B2 * | 11/2021 | Sohn | G06V 20/588 |
| 11,300,090 B2 * | 4/2022 | Dixon | F02D 41/064 |
| 11,377,071 B2 * | 7/2022 | Wall | H04W 4/023 |
| 11,451,384 B2 * | 9/2022 | Darnell | H04L 63/10 |
| 2009/0146846 A1 | 6/2009 | Grossman | G08B 29/22 340/988 |
| 2015/0015386 A1 * | 1/2015 | Langenhan | B60W 30/00 340/438 |
| 2015/0203062 A1 | 7/2015 | Gautama et al. | |
| 2015/0226146 A1 | 8/2015 | Elwart et al. | |
| 2017/0061800 A1 | 3/2017 | Davis | |
| 2017/0334380 A1 | 11/2017 | Bonnet et al. | |
| 2018/0082142 A1 * | 3/2018 | Han | G06V 20/63 |
| 2018/0194344 A1 | 7/2018 | Wang et al. | |
| 2019/0299929 A1 * | 10/2019 | Neuhoff | B60R 25/24 |
| 2019/0375404 A1 * | 12/2019 | Maleki | B60W 40/09 |
| 2020/0064847 A1 * | 2/2020 | Zhang | G01S 7/484 |
| 2021/0053515 A1 | 2/2021 | Dombrovskis | |
| 2021/0309235 A1 * | 10/2021 | Carlhoff | B60W 50/0098 |
| 2021/0309245 A1 | 10/2021 | Carlhoff et al. | |
| 2022/0141631 A1 * | 5/2022 | Willmann | H04L 67/12 340/12.5 |
| 2022/0274588 A1 | 9/2022 | Marek et al. | |

FOREIGN PATENT DOCUMENTS

| | | | | |
|---|---|---|---|---|
| CN | 104827989 | A | 8/2015 | |
| CN | 103761462 | B | 10/2016 | |
| CN | 106515619 | A | 3/2017 | |
| CN | 107178237 | A | 9/2017 | |
| CN | 111661039 | A | 9/2020 | |
| CN | 113492777 | A | 10/2021 | |
| CN | 113492781 | A | 10/2021 | |
| CN | 104827989 | B | 1/2022 | |
| CN | 114126954 | A | 3/2022 | |
| DE | 19839355 | C1 | 4/2000 | |
| DE | 102008005621 | A1 | 7/2009 | |
| DE | 102015002204 | A1 | 8/2015 | |
| DE | 102015011498 | A1 | 3/2016 | |
| DE | 102014018189 | A1 | 6/2016 | |
| DE | 102019211681 | A1 | 2/2021 | |
| DE | 102019211681 | B4 | 7/2021 | |
| DE | 102020109360 | A1 | 10/2021 | |
| DE | 102020109379 | A1 | 10/2021 | |
| EP | 3109801 | A1 * | 12/2016 | G06F 9/542 |
| EP | 3334198 | A1 * | 6/2018 | B60R 16/0231 |
| EP | 3569464 | A1 | 11/2019 | |
| GB | 2523898 | A | 9/2015 | |
| GB | 2528703 | A * | 2/2016 | G08B 13/1618 |
| JP | 2000118354 | A | 4/2000 | |
| JP | 2004227145 | A | 8/2004 | |
| JP | 3651314 | B2 | 5/2005 | |
| JP | 200669231 | A | 3/2006 | |
| JP | 3851413 | B2 | 11/2006 | |
| JP | 4035719 | B2 | 1/2008 | |
| JP | 4119108 | B2 | 7/2008 | |
| JP | 4146094 | B2 | 9/2008 | |
| RU | 2015103983 | A | 8/2016 | |
| WO | 2013174788 | A1 | 11/2013 | |
| WO | WO-2017218188 | A1 * | 12/2017 | G06F 3/048 |
| WO | 2021023420 | A1 | 2/2021 | |
| WO | 2022175475 | A1 | 8/2022 | |

OTHER PUBLICATIONS

Notice of Allowance dated Nov. 18, 2022; U.S. Appl. No. 17/209,459, filed Mar. 23, 2021.

* cited by examiner

CONTROL OF VEHICLE FUNCTIONS

CROSS-REFERENCE TO RELATED APPLICATION

This patent application claims priority to German Application No. DE 102020109379.9, filed Apr. 3, 2020, which is hereby incorporated by reference in its entirety.

BACKGROUND

Many driving situations require the driver or another user of the vehicle to repeatedly activate and/or disable certain vehicle functions. An example of this is a delivery or parcel driver who has to perform multiple vehicle functions, some in a certain order, when he stops the vehicle to deliver a parcel. This can include, for example: switching off the vehicle engine, closing the windows, setting the "park" switch position, activating the parking brake, turning off the ignition, opening doors, locking the vehicle, etc. Over a whole working day, it may be necessary to repeat these activities more than a hundred times.

In general, vehicle functions already exist which are carried out at least partially automatically under certain conditions. An example of this is the automatic setting of the "park" switch position in the case of an automatic transmission as soon as the driver's door is opened. However, such triggering events, also known as triggers, and the operations that are triggered by them are predetermined and cannot be adapted to individual needs.

In addition, certain vehicle functions or a specific procedure of vehicle functions cannot be linked to triggering events, such as turning off the air conditioner and increasing the radio volume when opening the top or the sliding roof. Often, only a single vehicle function is performed based on a single triggering event, or a complex of vehicle functions is performed, but this is predetermined by the manufacturer of the vehicle.

Against the background of ever-increasing vehicle functions, this means either an increase in the activities to be carried out by the driver or user of the vehicle or an inefficient use of the available vehicle functions. This can lead to annoyance of the driver or user due to numerous repetitive activities.

For example, from CN 1 03 761 462 A, a method for personalizing vehicle settings is known, with which the adjustment of the seat position and the rear-view mirror are linked to the voice of the driver and stored. When the driver's voice is recognized, the appropriate settings are made automatically, so that a manual adjustment is not required.

WO 2013/174 788 A1 describes a device for event-controlled automatic activation and/or deactivation and/or adjustment of at least one vehicle function system, for example a seat heating system, a radio, etc. The device has an operating interface with which the vehicle user can specify a rule that includes at least one condition for a selectable input variable and which in each case sets a selectable vehicle function system in relation to the selectable input variable. This enables automated vehicle function performance based on the rules that can be specified by the vehicle user. Optionally, a sequence of vehicle functions can also be linked to a rule.

US 2015/0 203 062 A1 discloses methods and systems for generating user profiles for a vehicle and a method for managing such a user profile. Data are generated to display a selection screen of a graphical user interface in the vehicle. Profile personalization data are then received, and a user profile is created from that data, which is stored. In addition, an identification of the user is provided.

EP 3 569 464 A1 describes a method that temporarily alters a characteristic of a vehicle feature depending on an emotional state of the vehicle user. There is no provision for a permanent definition of vehicle function sequences actively designed by the vehicle user.

The performance of vehicle function procedure schemas, i.e., temporal sequences with which multiple vehicle functions are carried out, usually involves multiple control devices and actuators. This means that it must be known which control unit is responsible for which vehicle function. The respective control unit must then be able to capture and process the triggering event (trigger) necessary for the performance of the vehicle function. In addition, any boundary conditions and prerequisites for the performance of the vehicle function must be known.

However, the assignment of the control unit, as well as the boundary conditions and prerequisites, may change if there is a change in the electrical architecture, software changes of the control units, or a change in the vehicle configuration.

In other words, vehicle function procedure schemas are usually implemented in a way that provides for the collection of all vehicle and/or configuration-specific information, analysis, and modifications. If the environment changes, i.e., for example the vehicle, the electrical architecture, etc., the vehicle function procedure schemas have to be re-implemented. In addition, there may also be a change in the triggering conditions.

SUMMARY

As described herein, it is possible to implement vehicle function procedure schemas universally, so that a simple change of the environment is possible. The present disclosure includes implementing an intermediate software level which allows a sequenced activation of vehicle functions by means of various control devices arranged in the vehicle.

A method for the automated performance of vehicle functions includes: checking for the existence of a triggering event; if there is a triggering event, selecting a vehicle function procedure schema associated with this triggering event; generating and outputting a signal representing the associated vehicle function procedure schema to a service; generating and outputting service signals based on the signal representing the associated vehicle function procedure schema to control devices designed for controlling vehicle function devices; generating and outputting control signals based on the service signals to the vehicle function devices; and performing vehicle functions based on the control signals.

Performance of the method can be computer-implemented, i.e., at least one step of the method, preferably multiple or all steps of the method, are performed using a computer program.

A vehicle may be understood as any mobile means of transport, i.e., both a land vehicle and a waterborne vehicle or an aircraft, for example a passenger car or a truck. The vehicle may be designed for semi-autonomous or fully autonomous operation.

Vehicle functions may mean functions which the vehicle can perform automatically, i.e., without the intervention of the driver or vehicle user, such as opening/closing of vehicle openings such as doors, windows, sliding roofs, etc., switching the ignition on/off, unlocking/locking the vehicle, switching the air conditioning on/off, reducing/increasing the volume and other settings of an infotainment system, setting a specific switch position, activating/disabling the parking brake, activating/disabling driving assistance systems, setting a specific seating position, switching lighting on/off, displaying certain contents in a display device, transmitting pre-set data to a computer cloud, etc. The vehicle functions are carried out by means of appropriate vehicle function devices.

A vehicle function procedure schema defines a temporal procedure with which the vehicle functions are performed. In other words, a chronological order is determined, wherein some vehicle functions can be performed in parallel, with a time offset relative to each other or time sequentially. In addition to a temporal procedure, a vehicle function procedure schema may also include conditions, loops, and user-defined subprograms. The vehicle function procedure schema may be determined by a user, wherein the user may be a vehicle driver, a vehicle owner, a service technician, a fleet manager, or another authorized person, for example.

Each vehicle function procedure schema has an associated triggering event that initiates the associated procedure when it occurs. A triggering event may also be associated with multiple vehicle function procedure schemas and therefore may initiate the procedure of multiple vehicle function procedure schemas.

In a simple case, the triggering event can be operating a button or a switch. Other triggering events can be based on speech input, i.e., the triggering event is the reception of a specific spoken word, phrase, sentence, etc. Furthermore, there is the possibility that the triggering event represents reaching a certain geographical position or a certain geographical area, which can be detected by means of a global navigation satellite system, for example.

To check for the presence of a triggering event, one or more input variables can be monitored, for example vehicle speed, time, temperature, humidity, etc. Appropriately designed sensors can be used for this purpose. These input variables are user-independent, so their value is not directly affected by the user. It is therefore possible to perform the vehicle function procedure schemas completely automatically. In addition, it may also be possible to provide user-dependent input variables, for example a position of a button or switch, which can be operated by the user.

In a simple embodiment, an input value of an input variable is determined and compared with a threshold value. For example, the current outdoor temperature can be measured and compared with a maximum or minimum temperature. If the threshold value is reached, exceeded, or not reached, this represents the occurrence of the triggering event and the vehicle function schema associated with the triggering event is performed.

In further embodiments, input values of multiple input variables can be determined and compared with related threshold values. The triggering event can be considered to have occurred when a certain fixed combination of threshold values is reached, exceeded, or not reached. In addition, further conditions may be examined, the fulfilment of which is a prerequisite for the occurrence or existence of the triggering event. For example, it may be provided as a basic prerequisite that the vehicle engine is in a switched on state.

Checking for the existence of a triggering event may be carried out by means of a control unit comprising means for checking for the existence of a triggering event. The control unit may be realized in hardware and/or software and may be physically formed as a single part or multiple parts. The control unit may be part of or integrated into an engine controller and arranged in the vehicle. Alternatively, the control unit may be located outside the vehicle, for example in a computer cloud.

If the existence of a triggering event is determined, a selection of a vehicle function procedure schema associated with the present triggering event is made. This can also be performed by means of the control unit, which accordingly also includes means for selecting a vehicle function procedure schema associated with the present triggering event.

For example, to select a vehicle function procedure schema, vehicle function procedure schemas stored in a memory unit can be accessed. Such a memory unit therefore has means for storing vehicle function procedure schemas. The saving can be done, for example, by means of a medium suitable for storing, for example a non-volatile memory, a DVD, a USB stick, a flashcard, or the like. The memory unit may be part of a control unit, for example an engine controller, or integrated into a control unit and arranged in the vehicle. Alternatively, the memory unit may be located outside the vehicle, for example in a computer cloud.

In a further step, a signal is generated and output which represents the vehicle function procedure schema associated with the triggering event. This signal is generated based on instructions or code programmed in the control unit according to one or more routines.

The signal representing the vehicle function procedure schema is output to a service.

A service can be understood as an independent unit that bundles related functionalities into a topic complex and provides them via a defined interface. In the context of the present method, the service abstracts vehicle-specific hardware and/or software properties for generating and outputting the control signals to the vehicle function devices. In other words, the service represents a level of abstraction that encapsulates technical details of the subsequent steps of the method and the related necessary devices and connects them to the control unit via a defined, for example standardized, interface.

Advantageously, the defined interface is immutable, i.e., it always remains the same, regardless of any changes to the subsequent hardware and/or software properties.

The service generates service signals based on the signal representing the linked vehicle function procedure schema and outputs these service signals to control devices designed to control vehicle function devices. For this purpose, the service includes means for generating and outputting service signals to control devices designed for controlling vehicle function devices based on the signal representing the linked vehicle function procedure schema.

Based on the service signals, control signals are then generated and output to the vehicle function devices. For this purpose, the control devices include means for generating and outputting control signals to vehicle function devices based on the service signals.

In a final process step, the vehicle functions defined by the vehicle function procedure schema are performed based on the control signals. For this purpose, vehicle function devices are used as actuators, which include means for the performance of vehicle functions based on the control signals.

An architecture is therefore described in which access to the control devices and the vehicle functional devices controlled by them is provided by the service. The user of this service, i.e., the control unit, requests vehicle functions according to the vehicle function procedure schema via the generic interface and therefore does not need to know details of the implementation after the interface, i.e., about which control device controls which actuator, for example.

This advantageously enables a simplified definition of vehicle function procedure schemas since they do not have to deal with implementation details. Vehicle function procedure schemas can also be easily transmitted from one vehicle to another. This means that the implementation is universal, so that a simple change of the environment is possible.

According to different examples, the service signals can be CAN signals.

For this purpose, the service, the control devices, and the vehicle function devices can be integrated into a CAN bus system (CAN, controller area network). Such a bus system is characterized by a low cabling cost, short signal paths and high reliability.

Another aspect concerns a system for the automated performance of vehicle functions. The system has: a control unit, comprising means for checking for the existence of a triggering event, selecting a vehicle function procedure schema associated with the present triggering event, and generating and outputting a signal representing the linked vehicle function procedure schema to a service; a service, comprising means of generating and outputting service signals to control devices designed to control vehicle function devices based on the signal representing the linked vehicle function procedure schema; control units, comprising means for generating and outputting control signals to vehicle function devices based on the service signals, and vehicle function devices, comprising means for performing vehicle functions based on the control signals.

The control unit and the service, the service, and the control devices, as well as the control devices and the vehicle function devices, are in a respective working signaling connection in each case in order to enable data and/or signal exchange. The respective working signaling connection may be wireless or wired.

For example, the system may be suitable for performing the above method for the automated performance of vehicle functions. The system can therefore also achieve the advantages of the method. All explanations concerning the method can be transferred to the system in the same way.

The system as a whole, i.e., all units, devices, the service, etc., can be arranged in the vehicle with or in which vehicle functions are to be performed. This advantageously allows the independent use of the system for a particular vehicle, since communication between the individual units, devices, the service, etc. is only necessary within the vehicle.

Alternatively, one or more or all units, devices, the service, etc. of the system may be located outside the vehicle. For example, the control unit and service may be arranged outside the vehicle, while the control devices and vehicle function devices may be located inside the vehicle. This enables, for example, the use of vehicle function procedure schemas by multiple vehicles. It is not necessary to equip each vehicle with all the equipment of the system, but it is sufficient. This could save costs and simplify the management, maintenance, servicing, etc. of the system due to at least partial centralization.

According to different examples, the service can abstract vehicle-specific hardware and/or software properties for generating and outputting the control signals.

According to further examples, the service signals can be CAN signals.

Another aspect concerns a vehicle with a system according to the description above.

Consequently, all the explanations relating to the system and the method that can be carried out can be transferred analogously to the vehicle. The advantages of the system can also be achieved with the vehicle.

Another concerns a computer program that includes commands that cause a system according to the above description to perform a method according to the above description.

Thus, the advantages of the system and the method are also achieved with the computer program. All explanations concerning the system and the procedure can be analogously transferred to the computer program.

A computer program can be understood as a program code that can be stored on a suitable medium and/or can be retrieved via a suitable medium. Any medium suitable for storing software, such as a non-volatile memory installed in a control unit, a DVD, a USB stick, a flashcard, or the like, can be used to store the program code. For example, the program code can be accessed over the Internet or an intranet, or over another suitable wireless or wired network.

Another aspect concerns a computer-readable medium on which the computer program is stored.

BRIEF SUMMARY OF THE DRAWINGS

Further explanation is provided in more detail below on the basis of the illustrations and the corresponding description. In the figures.

DETAILED DESCRIPTION

Figure 1:
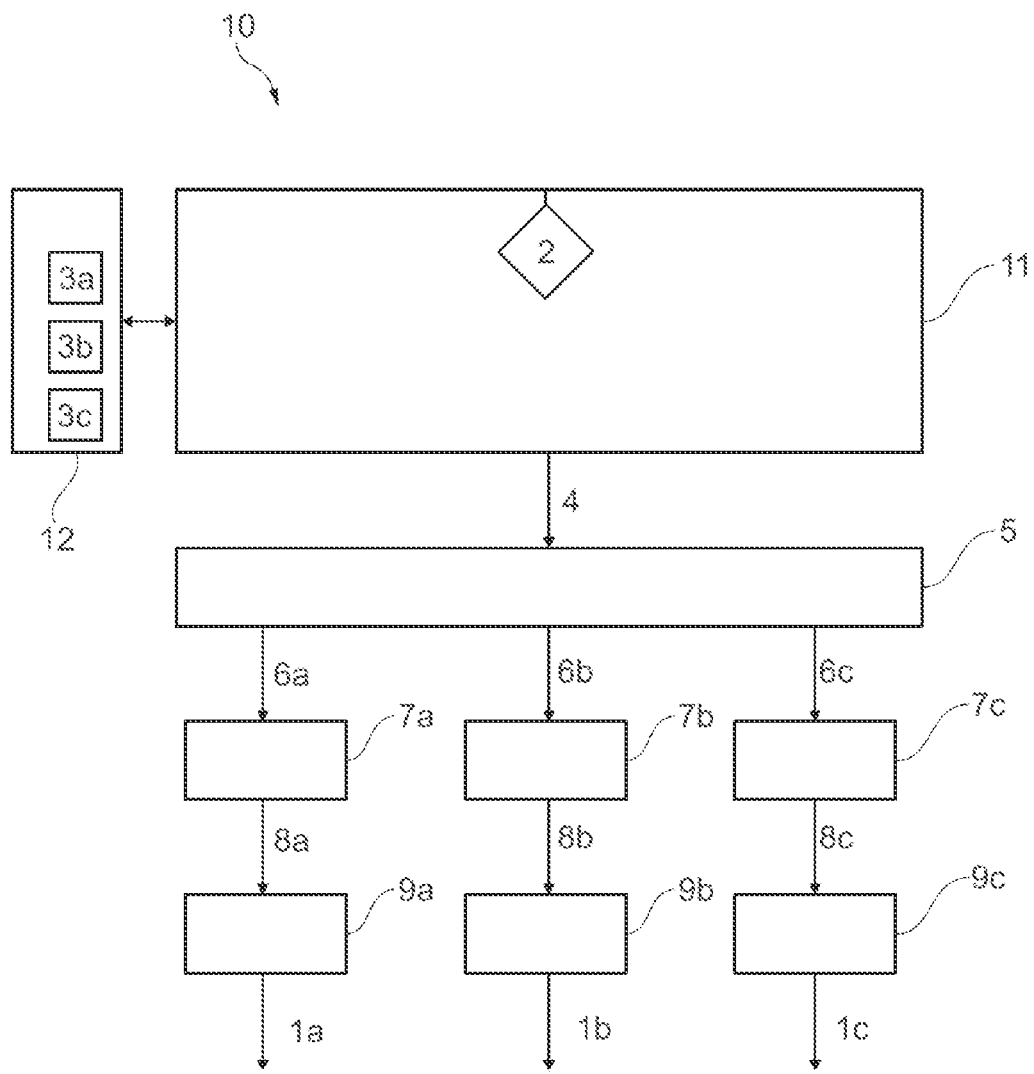
FIG. 1 shows a schematic representation of an exemplary system.

FIG. 1 shows an exemplary system 10 for the automated performance of vehicle functions 1a, 1b, 1c, wherein the vehicle functions 1a, 1b, 1c and their temporal procedure are specified by a vehicle function procedure schema 3a, 3b, 3c.

The system 10 comprises a control unit 11 with means for checking for the existence of a triggering event 2 and selecting a vehicle function procedure schema 3a, 3b, 3c associated with the present triggering event 2. For this purpose, the control unit 11 has a working signaling connection with a memory unit 12, characterized in FIG. 1 by a double arrow. The memory unit 12 stores multiple vehicle function procedure schemas 3a, 3b, 3c, etc.

For example, a vehicle procedure function schema 3a can be selected in which the following vehicle functions 1a, 1b, 1c, etc. are performed by the corresponding vehicle function devices 9a, 9b, 9c, etc.: switching off the vehicle engine, closing the windows, setting the "park" switch position, activating the parking brake, switching off the ignition, opening doors, locking the vehicle. Such a vehicle procedure function schema 3a can be used, for example, by a parcel driver, so that the driver does not have to carry out the mentioned operations individually and repeatedly. In this case, reaching a certain specifiable geographic location can be used as the triggering event 2, for example the location at which the parcel should be delivered. This allows a completely automatic procedure of the vehicle procedure function schema 3a, since reaching the geographical position can be captured by means of a sensor 15 and detected accordingly. Alternatively, for example, the operation of a button can be provided. The operation of the button constitutes the triggering event 2 in this case.

Furthermore, the control unit 11 comprises means for generating and outputting a signal 4 representing the linked vehicle function procedure schema 3a, 3b, 3c to a service 5.

The service 5 comprises means for generating and outputting service signals 6a, 6b, 6c to control devices 7a, 7b, 7c designed to control vehicle function devices 9a, 9b, 9c based on the signal 4 representing the linked vehicle function procedure schema 3a, 3b, 3c. In the exemplary embodiment, the service, the control devices, and the vehicle function devices are integrated into a CAN bus system. Consequently, the service signals 6a, 6b, 6c are CAN signals.

The system 10 also comprises control devices 7a, 7b, 7c with means for generating and outputting control signals 8a, 8b, 8c to vehicle function devices 9a, 9b, 9c based on the service signals 6a, 6b, 6c, as well as vehicle function devices 9a, 9b, 9c with means for performing vehicle functions 1a, 1b, 1c based on the control signals 8a, 8b, 8c. Here, the vehicle function devices 9a, 9b, 9c are actuators for performing the vehicle functions 1a, 1b, 1c. Vehicle function devices 9a, 9b, 9c may be, for example, a device for closing the windows, a device for activating the parking brake and a device for locking the vehicle 13.

In the exemplary embodiment, the control unit 11 and the memory unit 12 are arranged outside the vehicle 13, the vehicle functions 1a, 1b, 1c of which are to be performed automatically. For example, the control unit 11 and the memory unit 12 may be arranged in a computer cloud and may be connected to the vehicle 13 by radio transmission. The service 5, the control devices 7a, 7b, 7c and the vehicle function devices 9a, 9b, 9c are arranged in the vehicle 13, however.

The control unit 11 and the memory unit 12 can be operated centrally, so that communication with multiple vehicles is possible. In other words, a centralized control unit 11 and a centralized memory unit 12 can communicate with multiple services 5 of different vehicles 13. This enables a cost-effective and effective performance of vehicle functions 1a, 1b, 1c of multiple vehicles 13. In addition, such a design allows simplified fleet management, since for example vehicle function procedure schemas 3a, 3b, 3c can be specified centrally for multiple vehicles 13 and separate storage in each vehicle 13 is not required.

The service 5 abstracts vehicle-specific hardware and/or software properties which are relevant for the subsequent generation and output of control signals 8a, 8b, 8c. Consequently, the service 5 provides an interface for the communication of the control unit 11 with the devices arranged in the vehicle 13. Due to the control unit 11 communicating directly only with the service 5, but not with the individual control devices 7a, 7b, 7c, changes to the control devices 7a, 7b, 7c and/or to the vehicle function devices 9a, 9b, 9c can be carried out simply without changes in the communication between control unit 11 and service 5. Advantageously, the control unit 11 can also be used for the automated performance of vehicle functions 1a, 1b, 1c of different vehicles 13.

Even though the system 10 shown in FIG. 1 has three control devices 7a, 7b, 7c and three vehicle function devices 9a, 9b, 9c, the invention is not limited to this number and there may nevertheless be more or fewer control devices 7a, 7b, 7c and/or vehicle function devices 9a, 9b, 9c. In addition, the number of control devices 7a, 7b, 7c and vehicle function devices 9a, 9b, 9c does not necessarily have to match. For example, a control device 7a, 7b, 7c may also be designed for transmitting control signals 8a, 8b, 8c to multiple vehicle function devices 9a, 9b, 9c.

Figure 2:
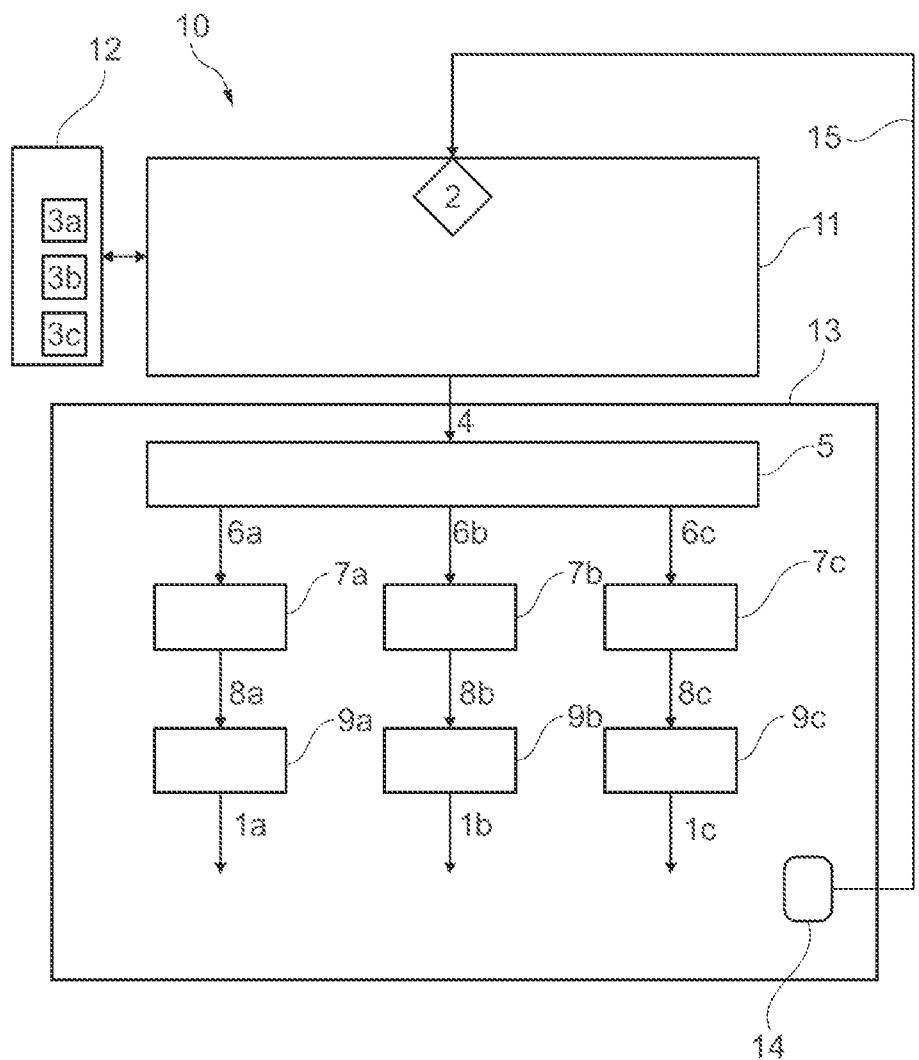
FIG. 2 shows a schematic representation of an exemplary vehicle.

FIG. 2 shows an exemplary vehicle 13 with a system 10 for the automated performance of vehicle functions 1a, 1b, 1c. The vehicle 13 may be designed as a passenger car, for example. FIG. 2 shows that the service 5, the control devices 7a, 7b, 7c and the vehicle function devices 9a, 9b, 9c are located within the vehicle 13, while the control unit 11 and the memory unit 12 are located outside the vehicle 13.

In addition to devices of the system 10, the vehicle 13 has a sensor 14, with which a property, for example a temperature, the operation of a button, reaching a certain geographical position, etc., can be detected and which can transmit a sensor signal 15 to the control unit 11. By evaluating the sensor signal 15, the control unit 11 determines whether a triggering event 2 is present or not. For a further explanation of the system 10, reference is made to the explanations relating to FIG. 1.

Figure 3:
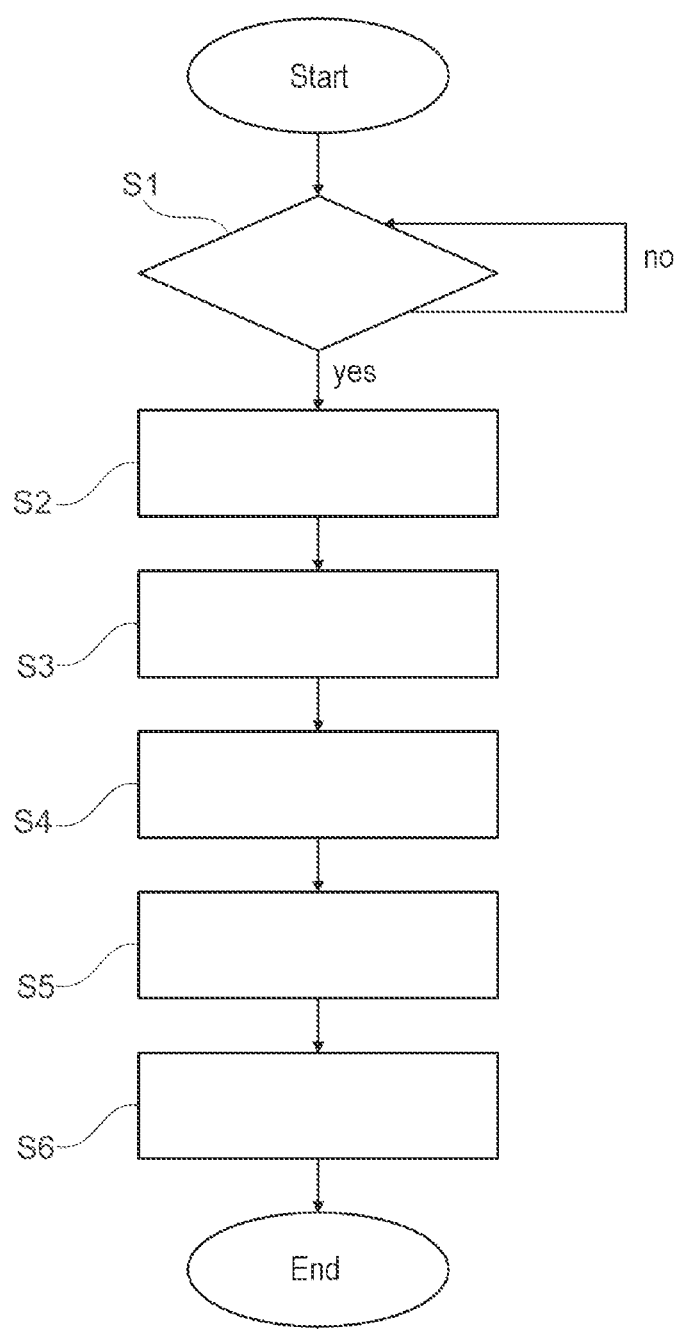
FIG. 3 shows a procedure schema of an exemplary method.

FIG. 3 shows a procedure schema of an exemplary method for the automated performance of vehicle functions 1a, 1b, 1c. After the start of the method, whether a triggering event 2 is present is checked for in step S1 by means of the control unit 11. If this is not the case, the existence of a triggering event 2 will continue to be checked for.

If the control unit 11 determines the existence of a triggering event 2, the method proceeds to step S2. In step S2, a vehicle function procedure schema 3a, 3b, 3c associated with the triggering event 2 is selected and retrieved from the memory unit 12.

In step S3, based on this vehicle function procedure schema 3a, 3b, 3c a signal 4 is generated by the control unit 11 and output to the service 5. In step S4, the service 5 generates service signals 6a, 6b, 6c and outputs these to the control devices 7a, 7b, 7c.

In step S5, the respective control devices 7a, 7b, 7c generate control signals 8a, 8b, 8c and output these to vehicle function devices 9a, 9b 9c. Finally, in step S6, the vehicle functions 1a, 1b, 1c are performed by the vehicle function devices 9a, 9b, 9c.

REFERENCE CHARACTER LIST 1a, 1b, 1c Vehicle function
2 Triggering event
3a, 3b, 3c Vehicle function procedure schema
4 Signal representing a vehicle function procedure schema
5 Service
6a, 6b, 6c Service signal
7a, 7b, 7c Control device
8a, 8b, 8c Control signals
9a, 9b, 9c Vehicle function device
10 System
11 Control unit
12 Memory unit
13 Vehicle
14 Sensor
15 Sensor signal
S1-S6 Steps of the method.

The invention claimed is:

1. A method, comprising:
upon determining a triggering event in a vehicle, selecting a vehicle function procedure schema that defines a sequence for carrying out a plurality of vehicle functions and that is associated with the triggering event;
generating and outputting a signal linking the selected vehicle function procedure schema to a service that abstracts vehicle-specific hardware and/or software properties for generating and outputting the control signals to vehicle function devices;

generating and outputting service signals, based on the signal linking the selected vehicle function procedure schema to a service, to control devices that control the vehicle function devices;

generating and outputting control signals based on the service signals to the vehicle function devices; and performing vehicle functions based on the control signals.

2. The method of claim 1, wherein the service abstracts vehicle-specific hardware or software properties for generating and outputting the control signals.

3. The method of claim 1, wherein the service signals are CAN signals.

4. The method of claim 1, wherein the vehicle function procedure includes at least one of switching off a vehicle engine, closing windows, setting a "park" switch position, activating a parking brake, switching off an ignition, opening doors, or locking the vehicle.

5. The method of claim 1, wherein the vehicle function devices include at least one of a device for closing windows, a device for activating a parking brake, or a device for locking the vehicle.

6. The method of claim 1, wherein the triggering event includes reaching a specified geographic location.

7. The method of claim 1, wherein the triggering event includes a user input.

8. A computing device comprising a processor and a memory, the memory including instructions executable by the processor to:

upon determining a triggering event in a vehicle, select a vehicle function procedure schema that defines a sequence for carrying out a plurality of vehicle functions and that is associated with the triggering event;

generate and output a signal linking the selected vehicle function procedure schema to a service that abstracts vehicle-specific hardware and/or software properties for generating and outputting the control signals to vehicle function devices;

generate and output service signals, based on the signal linking the selected vehicle function procedure schema to a service, to control devices that control vehicle function devices;

generate and output control signals based on the service signals to the vehicle function devices to perform vehicle functions based on the control signals.

9. The computing device of claim 8, wherein the service abstracts vehicle-specific hardware or software properties for generating and outputting the control signals.

10. The computing device of claim 8, wherein the service signals are CAN signals.

11. The computing device of claim 8, wherein the vehicle function procedure includes at least one of switching off a vehicle engine, closing windows, setting a "park" switch position, activating a parking brake, switching off an ignition, opening doors, or locking the vehicle.

12. The computing device of claim 8, wherein the vehicle function devices include at least one of a device for closing windows, a device for activating a parking brake, or a device for locking the vehicle.

13. The computing device of claim 8, wherein the triggering event includes reaching a specified geographic location.

14. The computing device of claim 8, wherein the triggering event includes a user input.

15. The computing device of claim 8, wherein the computing device is located outside of the vehicle.

16. The computing device of claim 8, wherein the vehicle is one of a plurality of vehicles controlled by the computing device.

* * * * *